United States Patent
Bartek et al.

(10) Patent No.: US 8,057,641 B2
(45) Date of Patent: Nov. 15, 2011

(54) METHOD AND APPARATUS FOR PYROLYSIS OF A BIOMASS

(75) Inventors: Robert Bartek, Centennial, CO (US); Ronald Lee Cordle, League City, TX (US)

(73) Assignee: Kior Inc., Pasadena, TX (US)

( * ) Notice: Subject to any disclaimer, the term of this patent is extended or adjusted under 35 U.S.C. 154(b) by 0 days.

(21) Appl. No.: 12/838,629

(22) Filed: Jul. 19, 2010

(65) Prior Publication Data

US 2011/0139596 A1   Jun. 16, 2011

(51) Int. Cl.
*C10B 49/20* (2006.01)

(52) U.S. Cl. .......... 201/12; 585/240; 585/241; 585/242; 44/605; 44/606; 208/106; 208/113; 208/126; 208/127; 201/2.5; 201/35; 201/36; 201/38; 201/39; 422/207; 422/647

(58) Field of Classification Search ............ 44/605–606; 585/240–242; 208/106, 113–126, 127, 159; 201/2.5, 12, 35–36, 38–39; 422/207, 647
See application file for complete search history.

(56) References Cited

U.S. PATENT DOCUMENTS

| | | | |
|---|---|---|---|
| 3,961,913 A | 6/1976 | Brenneman et al. | |
| 4,064,018 A | 12/1977 | Choi | |
| 4,147,593 A | 4/1979 | Frischmuth et al. | |
| 4,153,514 A | 5/1979 | Garrett et al. | |
| 4,266,083 A | 5/1981 | Huang | |
| 4,308,411 A | 12/1981 | Frankiewicz | |
| 4,711,873 A | 12/1987 | Suzukamo et al. | |
| 4,851,601 A | 7/1989 | Fukuda et al. | |
| 4,874,507 A | 10/1989 | Whitlock | |
| 4,987,114 A | 1/1991 | Suzukamo et al. | |
| 5,064,527 A | 11/1991 | Singhal et al. | |
| 5,097,088 A | 3/1992 | Fukao et al. | |
| 5,102,628 A | 4/1992 | De Lasa | |
| 5,115,084 A | 5/1992 | Himmelblau | |
| 5,233,109 A | 8/1993 | Chow | |
| 5,504,259 A | 4/1996 | Diebold et al. | |
| 5,599,510 A | 2/1997 | Kaminsky et al. | |
| 5,728,271 A | 3/1998 | Piskorz et al. | |
| 5,792,340 A * | 8/1998 | Freel et al. | 208/127 |
| 5,865,898 A | 2/1999 | Holtzapple et al. | |
| 5,959,167 A | 9/1999 | Shabtai et al. | |
| 5,961,786 A | 10/1999 | Freel et al. | |
| 6,022,419 A | 2/2000 | Torget et al. | |
| 6,069,012 A | 5/2000 | Kayser | |

(Continued)

FOREIGN PATENT DOCUMENTS

CA     1283880     5/1991

(Continued)

OTHER PUBLICATIONS

Lappas, A.A., et al. "Biomass Pyrolysis in a Circulating Fluid Bed Reactor for the Production of Fuels and Chemicals" Fuel IPC Science and Technology Press, Guildford, GB, vol. 81, No. 16, Nov. 1, 2002, pp. 2087-2095, XP004374414, ISSN: 0016-2361.

(Continued)

*Primary Examiner* — Walter Griffin
*Assistant Examiner* — Brian McCaig

(57) ABSTRACT

A method and apparatus for effective pyrolysis of a biomass utilizing rapid heat transfer from a solid heat carrier or catalyst. Particularly, various embodiments of the present invention provide methods and apparatuses which incorporate progressive temperature quenching and rapid disengagement of the heat carrier material and reaction product.

15 Claims, 1 Drawing Sheet

U.S. PATENT DOCUMENTS

| | | | |
|---|---|---|---|
| 6,248,297 B1 * | 6/2001 | Stine et al. | 422/144 |
| 6,485,774 B1 | 11/2002 | Bransby | |
| 6,814,940 B1 | 11/2004 | Hiltunen et al. | |
| 6,830,597 B1 | 12/2004 | Green | |
| 6,971,594 B1 | 12/2005 | Polifka | |
| 7,044,999 B2 | 5/2006 | Bankstahl et al. | |
| 7,202,389 B1 | 4/2007 | Brem | |
| 7,262,331 B2 | 8/2007 | Van de Beld et al. | |
| 7,341,973 B2 | 3/2008 | Flego et al. | |
| 7,503,981 B2 | 3/2009 | Wyman | |
| 2004/0180971 A1 | 9/2004 | Inoue et al. | |
| 2005/0145542 A1 | 7/2005 | O'Connor et al. | |
| 2007/0000177 A1 | 1/2007 | Hippo et al. | |
| 2007/0213573 A1 | 9/2007 | Ross et al. | |
| 2008/0009055 A1 | 1/2008 | Lewnard | |
| 2009/0013601 A1 | 1/2009 | Mandich et al. | |
| 2009/0093555 A1 | 4/2009 | Stites et al. | |
| 2009/0139851 A1 | 6/2009 | Freel | |
| 2009/0165378 A1 | 7/2009 | Agblevor | |
| 2009/0227823 A1 | 9/2009 | Huber et al. | |

FOREIGN PATENT DOCUMENTS

| | | |
|---|---|---|
| CA | 2618000 A1 | 2/2007 |
| DE | 202006012176 | 12/2006 |
| EP | 1719811 A1 | 11/2006 |
| EP | 1852466 A1 | 11/2007 |
| EP | 1852490 A1 | 11/2007 |
| EP | 1852492 A1 | 11/2007 |
| EP | 1878783 A1 | 1/2008 |
| EP | 2105486 A1 | 9/2009 |
| EP | 2107100 A1 | 10/2009 |
| WO | WO81/01713 A1 | 6/1981 |
| WO | WO02/14040 A1 | 2/2002 |
| WO | WO02/083816 A1 | 10/2002 |
| WO | WO2006/117006 A1 | 11/2006 |
| WO | WO2007/128798 A1 | 11/2007 |
| WO | WO2007/128799 A1 | 11/2007 |
| WO | WO2007/128800 A1 | 11/2007 |
| WO | WO2008/009643 A2 | 1/2008 |
| WO | WO2008/011598 A2 | 1/2008 |
| WO | WO2008/101949 A1 | 8/2008 |
| WO | WO2009/118352 A1 | 10/2009 |
| WO | WO2009/143017 A1 | 11/2009 |
| WO | WO2010/002792 A2 | 1/2010 |

OTHER PUBLICATIONS

Huber, George, W., et al. "Synthesis of Transportation Fuels From Bomass: Chemistry, Catalysts and Engineering" Chem.Rev.,; Chemical Reviews, Sep. 2006, vol. 106, No. 9, pp. 40-44-4098, 4047-4048, 4061-4063, 4085, 4092-4093, XP002490759.

McKendry, P., "Energy Production From Biomass," Bioresource Technology 83 (2002) p. 37-46.

Wyman, et al, "Coordinated Development of Leading Biomass Pretreatment Technologies" Bioresource Technology 96 (2005) 1959-1966.

Bridgwater, A.V. "Principles and Practice of Biomass Fast Pyrolysis Processes for Liquids" Journal of Analytical and Applied Pyrolysis, Jul. 1999 vol. 51, pp. 3-22, p. 15, para 4 to p. 16 para 2; p. 18, para 2.

Bridgwater, A.V., et al, "Fast Pyrolysis Processes for Biomass," Renewable and Sustainable Energy Reviews 4 (2000) 1-73.

* cited by examiner

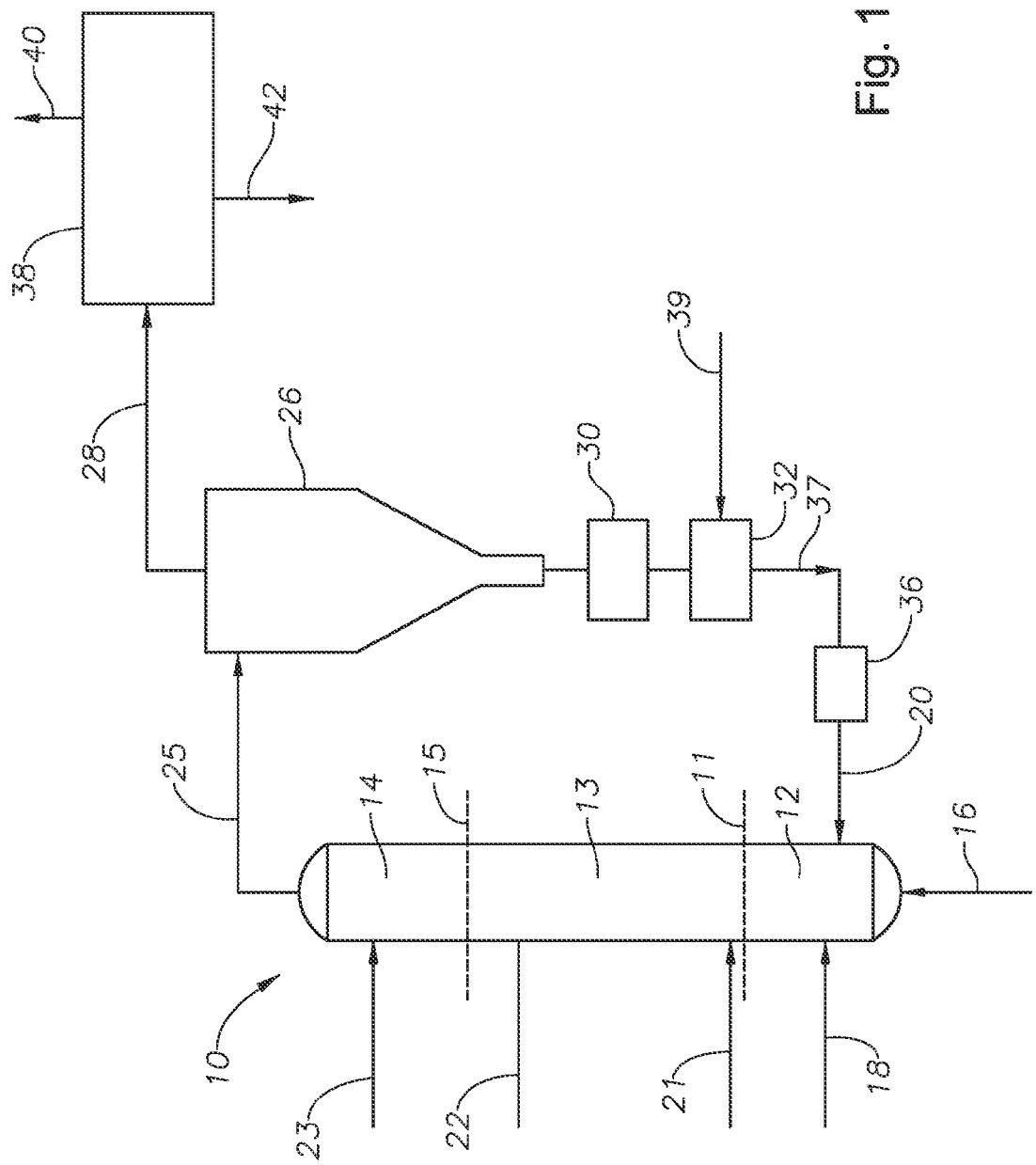

METHOD AND APPARATUS FOR PYROLYSIS OF A BIOMASS

FIELD OF THE INVENTION

Embodiments of the present invention relate generally to methods and apparatuses for effective pyrolysis of a biomass utilizing rapid heat transfer from a solid heat carrier material. Particularly, various embodiments of the present invention provide methods and apparatuses for which incorporate progressive temperature quenching and rapid disengagement.

BACKGROUND OF THE INVENTION

The processing of carbonaceous feedstock or biomass material to produce chemicals or fuels can be accomplished by pyrolysis. Pyrolysis is characterized by the thermal decomposition of materials in an oxygen-poor or oxygen-free atmosphere (i.e., significantly less oxygen than required for complete combustion). In the past, pyrolysis has referred to slow pyrolysis whose equilibrium products included non-reactive solids (char and ash), liquids (tar and/or pyroligneous liquor), and non-condensable gases.

More recently, it has been recognized that pyrolysis can be carried out through a fast (rapid or flash) pyrolysis method where finely divided feedstock is rapidly heated to between 150 and 600° C. and the reaction time is kept short, i.e. on the order of seconds. Such fast pyrolysis results in high yields of primary, non-equilibrium liquids and gases (including valuable chemicals, chemical intermediates, petrochemicals and fuels).

The non-equilibrium liquids (or bio-oil) produced by fast pyrolysis are suitable as a fuel for clean, controlled combustion in boilers and for use in diesel and stationary turbines. Accordingly, it is desirable to develop improved fast pyrolysis processes and equipment to better produce bio-oil from biomass.

SUMMARY

In one embodiment of the present invention, there is provided a process for biomass conversion comprising: providing a riser reactor having a mixing zone, an intermediate zone located above the mixing zone, and an upper zone located above the intermediate zone; charging a biomass feed and a heat carrier material to the mixing zone above the location where a lift gas is charged to the mixing zone, thereby forming a mixture; converting the biomass feed in the mixture to thereby form a reaction mixture comprising the heat carrier material and a product stream comprising oxygenated hydrocarbons; charging at least one quench stream to the riser reactor through at least one quench stream conduit connected in fluid flow communication with the riser reactor at a location within: i) the intermediate zone, ii) the upper zone, or iii) both the intermediate zone and the upper zone, thereby lowering the temperature of the reaction mixture; and separating at least a portion of the product stream from the heat carrier material in a heat carrier material/reaction product disengager which is connected in fluid flow communication with the upper zone of the riser reactor.

In another embodiment of the present invention, there is provided an apparatus for biomass conversion comprising a riser reactor having a mixing zone, an intermediate zone located above said mixing zone and forming interface with said mixing zone, and an upper zone located above said intermediate zone, wherein a biomass feed is mixed with a heat carrier material to produce a reaction mixture comprising said heat carrier material and a reaction product, which comprises oxygenated hydrocarbons. The apparatus further comprises a biomass feed conduit connected in fluid flow communication with the mixing zone for introducing the biomass feed to said riser reactor; a lift gas conduit connected in fluid flow communication with the mixing zone for introducing a lift gas to the riser reactor to assist in producing a general upward flow in the riser reactor; a heat carrier material conduit connected in fluid flow communication with the mixing zone for introducing the heat carrier material into the riser reactor; a first quench stream conduit connected in fluid flow communication with the riser reactor at a location just above the interface of the mixing zone and the intermediate zone, resulting in a lower temperature in the intermediate zone as compared to the mixing zone; and a disengager connected in fluid flow communication with the upper zone such that the reaction mixture is received in the disengager and at least a portion of the reaction product is separated from the heat carrier material within the disengager.

BRIEF DESCRIPTION OF THE DRAWING FIGURES

Embodiments of the present invention are described in detail below with reference to the attached drawing figure, wherein:

FIG. 1 is a schematic illustration of an embodiment of the present invention.

DETAILED DESCRIPTION

The following detailed description of various embodiments of the invention references the accompanying drawing, which illustrate a specific embodiment in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Referring now to FIG. 1, an embodiment of the present invention is provided wherein a transport reactor or riser reactor 10 suitable for fast pyrolysis in accordance with the present invention is provided. Reactor 10 has a mixing zone 12, an intermediate zone 13 located above the mixing zone and an upper zone 14 located above the intermediate zone. The interface between the mixing zone 12 and the intermediate zone 13 is represented by broken line 11. The interface between the intermediate zone 13 and the upper zone 14 is represented by broken line 15. A lift gas conduit 16 is connected in fluid flow communication with said mixing zone 12 so that lift gas can be introduced to the bottom portion of mixing zone 12. Additionally, biomass feed conduit 18 and heat carrier material conduit 20 are connected in fluid flow communication with mixing zone 12 for the introduction of biomass feed and heat carrier material, respectively, to mixing zone 12. Quench conduits 21, 22 and 23 are connected in fluid flow communication with reactor 10 just above the interface 11 of the mixing zone 12 and the intermediate zone 13, at the intermediate zone 13 and at the upper zone 14, respectively, for introducing a quenching medium.

A disengager 26 is in fluid flow communication with upper zone 14 of reactor 10 via conduit 25 so that reaction mixture comprising heat carrier material and reaction product can be introduced from reactor 10 into disengager 26. Disengager 26 is in fluid flow contact with a product stream conduit 28 for receiving reaction product from the disengager 26. Disengager 26 is also in fluid flow communication with a stripper 30 and a regenerator 32. Regenerator 32 is in fluid flow communication with conduit 37 which in turn is in fluid flow communication with optional heat carrier cooler 36 and heat carrier material conduit 20.

The product stream conduit 28 can be optionally connected in fluid flow communication with separation system 38. In separation system 38, components of the reaction product are separated, such as separating water (conduit 40) from the organic components (conduit 42) of the reaction product stream. Such water can be water produced during the reaction of the biomass material or water introduced as part of the quench stream.

In the process in accordance with the invention, a biomass material under goes pyrolysis in reactor 10, that is, heating of the biomass material in an oxygen-poor or oxygen-free atmosphere. The term "oxygen-poor" as used herein refers to an atmosphere containing less oxygen than ambient air. In general, the amount of oxygen should be such as to avoid combustion of the biomass material, or vaporized and gaseous products emanating from the biomass material, at the pyrolysis temperature. Preferably the atmosphere is essentially oxygen-free, that is, contains less than about 1 wt % oxygen.

The biomass material useful in the current invention can be any biomass capable of being converted to liquid and gaseous hydrocarbons. Preferred biomass material is solid biomass materials comprising cellulose, in particular lignocellulosic materials, because of the abundant availability of such materials, and their low cost. Examples of suitable solid biomass materials include forestry wastes, such as wood chips and saw dust; agricultural waste, such as straw, corn stover, sugar cane bagasse, municipal waste, in particular yard waste, paper, and card board; energy crops such as switch grass, coppice, eucalyptus; and aquatic materials such as algae; and the like.

Pyrolysis as used herein refers to processes for converting all or part of the biomass to bio-oil by heating the biomass either with an inorganic particulate inert material (such as sand) or with a catalytic material (sometimes referred to as catalytic pyrolysis or biomass catalytic cracking). If the heat carrier material is a catalytic material, it can be selected from the group consisting of: a solid base, a clay, an inorganic oxide, an inorganic hydroxide, a zeolite, a supported metal, and combinations thereof. The solid base can be selected from the group consisting of: hydrotalcite; a hydrotalcite-like material; a clay; a layered hydroxy salt; a metal oxide; a metal hydroxide; a mixed metal oxide; or a mixture thereof.

The catalyst can also be an equilibrium catalyst ("E-cat") from a fluid catalytic cracking ("FCC") unit of an oil refinery. The term refers to catalyst material that has, on average, circulated in the FCC unit for a considerable length of time. The term is used to distinguish fresh catalyst, which has not been exposed to the environment of the FCC unit, and which has much greater catalytic activity than the E-cat. The term E-cat also refers to catalyst material that is removed from the FCC unit, to be replaced with fresh catalyst. This spent catalyst is a waste product from oil refineries, and as such, is abundantly available at low cost. It has been found that the reduced catalytic activity of E-cat is in fact of particular advantage in the pyrolysis process.

Rapid heating of the solid biomass material can generally be accomplished by providing the solid biomass material in the form of particles having a low mean particle diameter. Preferably, the mean particle diameter of the biomass is less than about 2000 μm, and more preferably less than about 1000 μm.

The biomass material can also be subjected to pretreatment prior to charging to the reactor in order to aid in the rapid heating and pyrolysis of the biomass material. The pretreatment can comprise a method selected from the group consisting of: a) drying; b) heat treatment in an oxygen-poor or oxygen-free atmosphere; c) solvent explosion; d) mechanical treatment with catalyst particles which can be carried out in a mixer, a mill, a grinder, or a kneader; e) demineralization; f) swelling in an aqueous solvent; g) impregnation of catalytic agents, mineral acids, organic acids, mineral bases; or h) a combination thereof.

Demineralization may be accomplished by swelling the biomass material with an aqueous solvent, and subsequently removing at least part of the aqueous solvent by mechanical action.

Suitable examples of mechanical action include kneading, grinding, milling, pressing and shredding. In a preferred embodiment the mechanical action is carried out in the presence of a particulate inorganic material, preferably a catalyst for the subsequent pyrolysis reaction.

The mechanical treatment described above can form an activated feed: a) coated with said catalyst particles, or b) having said catalyst particles embedded therein, or c) both a) and b).

The term "solvent explosion" refers to a process by which the biomass material is contacted with a solvent in its liquid form, under pressure, at a temperature which is above the normal boiling point of the solvent. After the solvent is allowed to penetrate the biomass material, the pressure is released precipitously, resulting in a rapid evaporation of the solvent. The resulting pressure build-up in the pores of the biomass material can result in a rupturing of the structure of the biomass material, making it more susceptible to the subsequent size reduction and pyrolysis reaction.

The heat treatment can be at a temperature in the range of from 90 to 300 C. In one preferred embodiment the heat treatment is at a temperature in the range of from 90 to 300 C, more preferably from 110 to 200 C. The heat treatment results in a modification of the structure of the biomass material, making it significantly more susceptible to mechanical action.

Examples of suitable materials for impregnation into the biomass include sulfuric acid; ammonia; alkali metal and earth alkaline hydroxides; alkali metal and earth alkaline carbonates; salts; hydrochloric acid; acetic acid; and the like. It should be noted that acetic acid, together with the other lower carboxylic acids (formic acid; propionic acid), although organic materials, are considered inorganic acids in this context.

The biomass material is introduced into mixing zone 12 of reactor 10 through biomass feed conduit 18 and heat carrier material is introduced into mixing zone 12 of reactor 10 through heat carrier conduit 20 such that they mix in mixing zone 12 to form a reaction mixture. The heat carrier material can be cooled in a heat exchanger 36 prior to being introduced into mixing zone 12. The heat carrier material should be at sufficient temperature to insure that the reaction mixture has a temperature from about 300 C to about 600 C by the time it reaches the interface 11 between the mixing zone 12 and the intermediate zone 13. More preferably, the temperature of the reaction mixture should be from about 450 C to about 575 C by the time the reaction mixture reaches the interface 11.

A lift gas is provided to reactor 10 through lift gas conduit 16. The lift gas aids in providing a general upward flow in reactor 10. Reaction time is critical in a fast pyrolysis and, therefore, the use of lift gas should be suitable to ensure that the total contact time between the biomass material and the heat carrier material is less than about 2 seconds. In a preferred embodiment, the upward flow should be sufficient so that the contact time is less than about 1 second and, more preferably, less than 0.7 second. The contact time is the time from the initial mixing of the biomass material and the heat carrier material in mixing zone 12 to the separation of the product stream from the heat carrier material in disengager 26 (as further described below). The lift gas may be steam, nitrogen, recycled product gases, or low molecular weight hydrocarbons such as methane, ethane or ethylene.

The upwardly flowing reaction mixture is quenched in intermediate zone 13 and/or upper zone 14 by introduction of a quenching stream by at least one quench stream conduit 21, 22 and 23. Although, three quench conduits are illustrated in FIG. 1, it is within the scope of this invention to have more or less quench conduits and to have quench conduits only for the intermediate zone 13 or only for the upper zone 14.

It has been discovered that the addition of a reaction-quenching stream that rapidly cools the reaction mixture is highly beneficial for improving the yields of oil. The quenching of the reaction mixture should be designed to limit residence time at secondary reaction temperatures, yet retain sufficient heat to prevent yield robbing condensation, and lower the production of gas and coke. Accordingly, typically the quench streams will lower the temperature of the reaction mixture by about 25 to about 400 C and, preferably, about 50 to about 200 C, so that the reaction mixture is at a quench temperature. Also, it is preferred that the quenching medium be introduced as near as possible to the mixing zone 12; thus, in a preferred embodiment of the present invention, at least one quench conduit would be located in the intermediate zone just above the mixing zone. More preferably, at least one quench conduit would be located in the intermediate zone just above the mixing zone 12 and subsequent quench conduits would be located along the course of the riser at locations in the intermediate zone 13 and the upper zone 14. In a particularly preferred embodiment, the reaction mixture is lowered to the quench temperature by a plurality of said quench streams in both the intermediate zone 13 and the upper zone 14. One such arrangement would be lowering the reaction mixture by about 20 to about 60 C increments by each of a first, second and third quench streams with the first such quench stream being introduced by quench stream conduit 21 in the intermediate zone 13 just above the interface 11.

The quenching streams can be liquids or gases and can be inert to the reaction products or can be reactive forming new compounds in whole or in part with the reaction products, such as alcohols which react to form stabilized organic compounds. Preferred quenching streams comprise a fluid selected from the group consisting of water, steam, caustic solutions, hydrotreated organics liquids, recycle bio-oil, carbon monoxide, carbon dioxide, ethane, ethylene, propane, propylene, methanol and other alcohols, naphthas, gas oil, and combinations thereof. Additionally, water separated from the reaction product can be recovered and used in the quenching streams. If water or steam are used as the quenching stream, the quenching stream can further contain dissolved organic material, especially preferred are organics that form stabilized organic compounds with the reaction products.

Reaction mixture from the upper zone 14 of reactor 10 is introduced into a disengager 26. In FIG. 1 the reactor 10 and disengager 26 are shown to be in fluid flow contact via conduit 25; however, the reactor 10 and disengager can also be in direct fluid flow contact with each other. The disengager 26 can be any suitable system for rapidly separating the heat carrier material from the reaction product, such as one or more cyclone separators. It has been discovered that rapid disengaging of the heat carrier material from the reaction product results in limiting secondary reactions that produce more char and coke and less liquids. Thus, it is preferred that the disengager 26 be closely coupled to reactor 10 to aid in achieving the short contact times described above.

Heat carrier material from disengager 26 can be introduced into a stripper 30 and regenerator 32 prior to being introduced into heat exchanger 36 and, subsequently, reintroduced into the reactor 10. Also, fresh heat carrier material can be introduced into regenerator 32 through conduit 39. If a catalyst is used as the heat carrier material, there may also be some heat catalyst withdrawn from regenerator 32 to maintain sufficient activity of the circulating catalyst inventory.

The reaction product from disengager 26 can be introduced into separation system 38 in order to separate the components of the reaction product, as previously described.

While the technology has been particularly shown and described with reference to specific embodiments, it should be understood by those skilled in the art that various changes in form and detail may be made without departing from the spirit and scope of the technology as defined by the appended claims.

As used herein, the terms "a," "an," "the," and "said" means one or more.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the terms "comprising," "comprises," and "comprise" are open-ended transition terms used to transition from a subject recited before the term to one or elements recited after the term, where the element or elements listed after the transition term are not necessarily the only elements that make up of the subject.

As used herein, the terms "containing," "contains," and "contain" have the same open-ended meaning as "comprising," "comprises," and "comprise," provided below.

As used herein, the terms "having," "has," and "have" have the same open-ended meaning as "comprising," "comprises," and "comprise," provided above As used herein, the terms "including," "includes," and "include" have the same open-ended meaning as "comprising," "comprises," and "comprise," provided above.

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as it pertains to any apparatus not materially departing from but outside the literal scope of the invention as set forth in the following claims.

What is claimed is:
1. A process for biomass conversion comprising:
a) utilizing a riser reactor having a mixing zone, an intermediate zone located above said mixing zone, and an upper zone located above said intermediate zone;

b) charging a biomass feed and a heat carrier material to said mixing zone above the location where a lift gas is charged to said mixing zone, thereby forming a mixture;

c) converting said biomass feed in said mixture to thereby form a reaction mixture comprising said heat carrier material and a product stream comprising oxygenated hydrocarbons;

d) charging at least one quench stream to said riser reactor through at least one quench stream conduit connected in fluid flow communication with said riser reactor at a location within: i) said intermediate zone, ii) said upper zone, or iii) both said intermediate zone and said upper zone, thereby lowering the temperature of said reaction mixture; and e) separating at least a portion of said product stream from said heat carrier material in a disengager which is connected in fluid flow communication with said upper zone of said riser reactor.

2. The process of claim 1 wherein the temperature of said reaction mixture produced in step c) is in the range of from about 300 C to about 600 C; and wherein the temperature of said reaction mixture is lowered by 25 to 400 C by said at least one quench stream in step d) so that the reaction mixture is at a quench temperature.

3. The process of claim 2 wherein said at least one quench stream in step d) is introduced at the interface between said mixing zone and said intermediate zone.

4. The process of claim 2 wherein the temperature of said reaction mixture is lowered to said quench temperature through the introduction of a plurality of said quench streams in both said intermediate zone and said upper zone.

5. The process of claim 4 wherein the temperature of said reaction mixture is lowered by about 20 to about 60 C by each of a first, second and third of said quench streams.

6. The process of claim 1 wherein the temperature of said reaction mixture produced in step c) is in the range of from about 450 C to about 575 C; and wherein the temperature of said reaction mixture is lowered by 50 to 200 C by said at least one quench stream in step d) so that the reaction mixture is at a quench temperature.

7. The process of claim 1 wherein said at least one quench stream comprise a fluid selected from the group consisting of water, steam, caustic solutions, hydrotreated organics liquids, recycle bio-oil, carbon monoxide, carbon dioxide, ethane, ethylene, propane, propylene, methanol and other alcohols, naphthas, gas oil, and combinations thereof.

8. The process of claim 7 wherein said water or said steam are from water produced in the conversion process.

9. The process of claim 8 wherein said quench stream comprises water or steam and also comprises dissolved organics.

10. The process of claim 1 wherein components of said quench stream react with organic components of said product stream to form stabilized organic compounds.

11. The process of claim 1 wherein the time between biomass feed conversion in step c) and said separation of said product stream from said heat carrier in step e) is less than about 2 second.

12. The process of claim 11 wherein the time between biomass feed conversion in step c) and said separation of said product stream from said heat carrier in step e) is less than about 1 second.

13. The process of claim 12 wherein said heat carrier material/reaction product disengager in step d) comprises a cyclone which is closely coupled to said riser reactor.

14. The process of claim 13 wherein the time between biomass feed conversion in step c) and said separation of said product stream from said heat carrier in step e) is less than 0.7 second.

15. The process of claim 1 wherein said heat carrier material comprises a material selected from the group consisting of an inorganic inert material, an inorganic catalyst, and combinations thereof and wherein said biomass feed comprises lignocellulose.

* * * * *